(12) United States Patent
Emenheiser

(10) Patent No.: US 7,926,152 B2
(45) Date of Patent: *Apr. 19, 2011

(54) RETAINER APPARATUS

(76) Inventor: Matthew C. Emenheiser, Golden, CO (US)

( * ) Notice: Subject to any disclaimer, the term of this patent is extended or adjusted under 35 U.S.C. 154(b) by 372 days.

This patent is subject to a terminal disclaimer.

(21) Appl. No.: 11/938,768

(22) Filed: Nov. 12, 2007

(65) Prior Publication Data

US 2008/0250615 A1 Oct. 16, 2008

Related U.S. Application Data

(60) Provisional application No. 60/858,645, filed on Nov. 13, 2006.

(51) Int. Cl.
*A44B 13/02* (2006.01)

(52) U.S. Cl. ........ 24/303; 24/599.1; 24/600.9; 24/601.7

(58) Field of Classification Search ............ 24/303, 24/599.1, 599.9, 600.9, 601.5, 601.7, 521, 24/265 H; 294/82.19, 82.2
See application file for complete search history.

(56) References Cited

U.S. PATENT DOCUMENTS

| | | | |
|---|---|---|---|
| 389,037 A * | 9/1888 | Wilkinson | .......... 24/163 R |
| 3,083,431 A | 4/1963 | Lewis | |
| 3,097,406 A * | 7/1963 | Yarborough | .......... 24/3.7 |
| 3,292,226 A | 12/1966 | Foster | |
| 3,912,318 A | 10/1975 | Engh | |
| 4,095,316 A | 6/1978 | Gabriel | |
| 4,121,867 A | 10/1978 | Muller | |
| 4,179,148 A | 12/1979 | Johnson | |
| 4,231,586 A | 11/1980 | Krause | |
| 4,333,212 A | 6/1982 | Bibollet | |
| 4,528,729 A | 7/1985 | Schmidt et al. | |
| 5,026,088 A | 6/1991 | Stuart | |
| 5,361,726 A | 11/1994 | Harris et al. | |
| 5,416,955 A | 5/1995 | Katsma | |
| 6,457,746 B1 | 10/2002 | Schepers | |
| 6,606,769 B1 | 8/2003 | Harris | |
| 6,702,328 B2 | 3/2004 | Malleis et al. | |
| 7,441,424 B2 * | 10/2008 | Saitoh et al. | .......... 70/19 |
| 2005/0283953 A1 * | 12/2005 | Jeffrey | .......... 24/303 |

* cited by examiner

*Primary Examiner* — Daniel P Stodola
*Assistant Examiner* — Michael Lee
(74) *Attorney, Agent, or Firm* — Roger A. Jackson

(57) ABSTRACT

A retainer apparatus and method for removably engaging a first article to a second article includes a beam having a first end portion sized and configured as an open ended hook and a second end portion that attaches to the first article. Also included in the retainer apparatus is a finger that has magnetic attraction to the second article, the finger is disposed adjacent to the second end portion of the beam, with the finger having an open state position allowing free passage of the hook through an aperture of the second article, the finger also having a closed state position wherein the finger is adjacent to the hook such that the hook and finger form a converging interface thereby engaging the first and second articles. Further included is structure for urging the finger from the open state position to the closed state position.

3 Claims, 13 Drawing Sheets

US 7,926,152 B2

RETAINER APPARATUS

RELATED PATENT APPLICATION

This application claims priority from U.S. provisional patent application Ser. No. 60/858,645 filed Nov. 13, 2006 by Matthew Emenheiser.

TECHNICAL FIELD

The present invention relates generally to an apparatus, which is employed to retain cargo or an article, which is being transported or moved, from undesired movement that could result in the cargo or article being in an unsafe location. More specifically, the present invention relates to the field of controlling the retention of cargo or article that is in a transport mode, wherein the undesired or unsafe movement of the cargo or the article during transit can cause damage to the cargo or article thereby possibly creating a hazardous situation for the cargo or article in moving to an unsafe and/or un-accessible location.

BACKGROUND OF INVENTION

Industrialized countries rely upon transportation systems such as over the road trucks, trains, airplanes, and boats for distribution and transportation of both large objects and balky commodities. It is important to the safety of the transportation vehicle, whether it be a truck, car, boat, or train, and to the safety of the cargo or article that is transported, that the cargo or article is stabilized and/or retained while being transported. If the cargo or article shifts or moves during transport, the cargo or article can be damaged, ejected, or lost, in addition, the inside of the cargo container can also be damaged. Further, if the cargo or article is not sufficiently stabilized to avoid shifting, the cargo or article can potentially unbalance the vehicle and create a dangerous situation. For example, if a vehicle is loaded so that the cargo or article is distributed evenly in the cargo area of the vehicle and the cargo or article shifts its location dramatically while the vehicle is traveling, for instance during the negotiation of a curve on the road, the shifting cargo or article can potentially upset the vehicles center of gravity to such an extent to possibly cause the driver of the vehicle to lose control of the vehicle.

To avoid cargo or article shifting, cargos or articles are packed as carefully as possible in the container to eliminate any open spaces within the container to minimize the possibility of the cargo or article shifting. In many circumstances, however, depending upon the specific type of cargo or the nature and size or bulk of the cargo, necessarily result in open spaces between the cargo or article items within the cargo container, especially in the case of the cargo container being partially filled with cargo or articles which is a quite common occurrence. This is especially true where the cargo or article is heavy, or of such a unique shape such as a piece of cargo or article that is very long and narrow, that the cargo container may be at best a compromise to contain the cargo or article and retain it securely, thus of necessity requiring an open (not having sidewalls or a roof) transportation platform or medium such as a flat bed truck, or flat bed rail car, or flat bed trailer. In order to secure the open regions of the cargo container, it is desirable to provide some sort of restraint device between the cargo or article and the walls of the cargo bed. These types of cargo or article retention devices need to be constructed to withstand the shifting forces typically encountered during transport of the cargo or articles. Likewise, they must also be relatively lightweight and preferably capable of adapting to any number of size differences that exist between the various cargo containers and cargo or article shapes. It is also desired that the cargo retention device is easily portable and movable and readily securable/unsecurable within the cargo container space thus allowing the cargo retention device to be easily installed or removed from the cargo containing area.

Focusing specifically on light duty trucks and/or trailers and their respective cargo containing areas the aforementioned problem has been well recognized in the proper art. Furthermore, in retaining cargo or the article by utilizing a flexible strap (with the strap usually having flexibility parallel to its lengthwise axis and reduced flexibility transverse to its lengthwise axis) wherein the strap forms an attachment between the transporting medium and the cargo or article to help prevent the undesirable movement of the cargo or article. As the strap usually has two open or free ends, there is of necessity a strap retainer apparatus required that is adapted to attach to one of the open ends, to facilitate engagement and disengagement of the strap secured around the cargo, wherein the other strap open end is typically substantially selectively fixedly adjustable along the lengthwise axis of the strap or the strap can be tensioned or "cinched" around the cargo or article by manually applying a force along the strap lengthwise axis away from the cargo or article. Thus, one exemplary focus of the prior art review is on the strap apparatus, specifically its attachment to the strap and/or other structure to selectively fixedly retain the strap along the lengthwise axis of the strap.

Further, for retaining articles, the retainer apparatus can be used outside of the cargo applications area, for example for pet leashes that typically use a snap type hook to connect the main body of the leash being the nylon strap type webbing, also life lines, cranes, hoists, and related applications. Additional applications would be somewhat akin to carabineer type applications for sports activities, such as mountaineering, camping, skiing, snowboarding, boating, water skiing, and all other related applications wherein anywhere a removable engagement is desired between two elements.

In looking at the typical prior art for retainer apparatus type mechanisms, starting with U.S. Pat. No. 4,179,148 to Johnson disclosed is a snap hook including a keeper arm swingably mounted thereto, so that a line passed through the eye of the snap hook is adapted to be clampingly engaged against movement of the line in an opposite direction through the line, referencing column 2, lines 4-9 and 18-20. Basically Johnson has the added feature of a slidable engagement that can axially grip a compressible cable at a selected axial location by way of a pinching lever arm coupled with a conventional carabineer type retainer. Continuing, in U.S. Pat. No. 4,095,316 to Gabriel disclosed is a carabineer that includes a C-shaped, elongated body member and an elongated closure member that is pivotally movable on one longitudinally terminal portion of the body member toward and away from a closing position in which both members jointly constitute a closed loop. Gabriel uses novel structure in having thin and thick walls segments for the middle body and end portions respectively to stamp the end portions of the body member loop for the pivot and engagement interfaces to have a smooth inner contour without the need for machining.

Further, looking at U.S. Pat. No. 5,361,726 to Harris et al. disclosed is an animal leash comprising two elements, a lead made of woven nylon with a loop at each end, and a carabineer attached to one or both of the loops and a collar, halter, or harness. The combination in Harris et al., provides a simple and convenient attachment of the leash to the animal, reference column 1, lines 67-68 and column 2, lines 1-3 and 25-27, wherein the combination is principally the loops and the carabineer in accommodating easy engagement and disengagement of the lead/carabineer combination from the animal. Yet continuing in U.S. Pat. No. 3,083,431 to Lewis disclosed is a safety snap hook which will not accidentally open or release. The snap hook in Lewis has a guard overlying the latch to protect from being opened by a pressure from D type or O type rings, should the means for urging the latch closed fail, the guard will prevent the latch from inadvertently opening. The D type or O type rings are engaged by the hook in Lewis, wherein the guard is movable to apply pressure to the snap tongue or latch for opening same by one hand of the user, reference column 1, lines 7-9 and 39-44. Continuing, in U.S. Pat. No. 3,292,226 to Foster disclosed is a snap hook having opening and closing movements of the snap hook member under control of the thumb and forefinger of the user, to maintain the hook effectively closed and open until desired to be closed that includes a means for urging that acts to help keep the snap hook open and when closed the means for urging assists in engaging a locking bar into a notch, reference, column 1, lines 28-33.

What is needed is a strap retainer apparatus that is simple and effective in design in having a simple and easy engagement and disengagement possible between for instance a pair of articles for helping to achieve a high level of convenience even allowing for a potential one handed operation in the engagement and disengagement process. In situations involving outside environment applications, wherein the weather is cold and the user of the retainer apparatus possibly has gloves on, especially on the engaging process of the retainer apparatus to the article it would be desirable to engage the retainer apparatus to the article by merely placing the retainer apparatus proximate to but not necessarily in contact with the article, wherein the article could be magnetically attracted to the retainer apparatus and with a single movement of the user's hand holding the retainer apparatus, the retainer apparatus engages the article, which can be useful in situation wherein the article is difficult to see, or have access to, or in low light environmental conditions. This is as opposed to most of the previously described prior art clasping or snap hooks that require typically at least three movements of the user hand such as squeezing (first movement) open the clasp and then positioning (second movement) the hook through the article while continuing the squeeze the clasp and then releasing (third movement) the clasp to close after the hook is positioned through the article to result in the retainer apparatus being positively engaged to the article. Thus, typically the prior art clasping or snap hooks have a more time consuming effort by the user needing to articulate three movements with their hand and having a requirement for a visual observation of the snap hook and article interface to successfully engage the snap hook to the article, which can be difficult especially in the case of gloved hands of the user and reduced lighting environmental conditions.

SUMMARY OF INVENTION

Broadly, the present invention is a retainer apparatus for removably engaging a first article to a second article, the second article being capable of magnetic attraction and having an aperture therethrough. The retainer apparatus includes a beam having a longitudinal axis, with the beam including a first end portion and a second end portion wherein the longitudinal axis spans in-between the first end portion and the second end portion. Further, the first end portion is sized and configured as an open ended hook that is removably engagable with the second article aperture, and the beam is also adapted to attach to the first article. Continuing, the retainer apparatus also includes a finger that is capable of magnetic attraction, the finger is disposed adjacent to the second end portion, with the finger having an open state position allowing free passage of the hook through the aperture, and the finger also having a closed state position wherein the finger is adjacent to the hook such that the hook and finger form a converging interface. In addition, the retainer apparatus includes a structure for urging the finger from the open state position to the closed state position. Operationally, the retainer apparatus removably engages the first article to the second article when the finger and the second article are magnetically attracted to one another and then further with a manual application of a single force in a direction to move the second article into the converging interface. With the second article placing the finger into the open state with the finger returning to the closed state upon the second article passing through the converging interface that results in engagement of the first article to the second article.

These and other objects of the present invention will become more readily appreciated and understood from a consideration of the following detailed description of the exemplary embodiments of the present invention when taken together with the accompanying drawings, in which;

REFERENCE NUMBERS IN DRAWINGS

Figure 1:
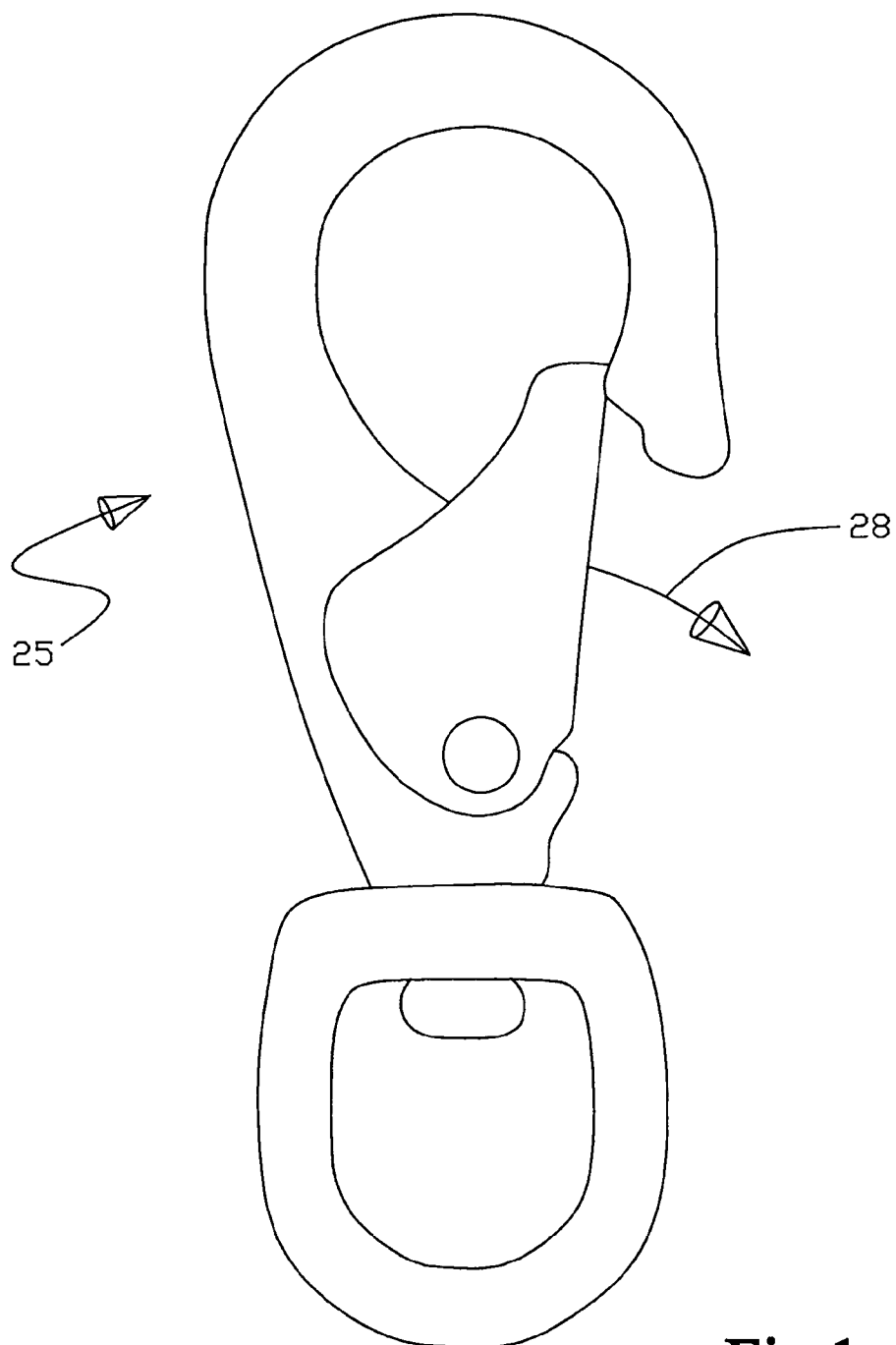
FIG. 1 is a side elevation view of a prior art snap hook typically used for a pet leash application.

25 Prior art pet leash snap hook
26 Prior art telemark ski leash snap hook
27 Prior art ski leash clip wire snap hook 28 Prior art latch urging movement direction
30 Retainer apparatus
32 First article
34 Second article
36 Aperture therethrough of second article 34
38 Beam
40 Longitudinal axis of beam 38
42 First end portion of beam 38
44 Second end portion of beam 38
46 Open ended hook of beam 38 first end portion 42
48 Surface of the open ended hook 46
50 Termination of open ended hook 46 in a cantilever fashion
52 Overlap of open ended hook 46 cantilever
54 Adapting attachment of beam 38 to first article 32
56 Finger
58 Finger surface
60 Magnetic attraction of the finger 56 to second article 34
62 Magnetic surface of finger 56
64 Adjacent disposing of finger 56 to second end portion 44
66 Open state position of finger 56
68 Free passage of hook 46 through the aperture 36
70 Closed state position of finger 56
72 Adjacent position of finger 56 to hook 46
74 Converging interface
76 Acute angle formed between the surface 48 of the open ended hook 46 and the surface 58 of the finger 56
78 Origination point of acute angle 76
80 Means for urging the finger 56 from the open state 66 to the closed state 70
81 Movement direction for means 80 for urging finger 56
82 Pivotal attachment between the finger 56 and the beam 38
84 Magnetic element as a means 80 for urging the finger 56
86 Spring element as a means 80 for urging the finger 56
88 Magnetic attraction of the finger 56 to the second article 34
90 Manual application of a single force
92 Direction of single force 90
94 Furthering or drawing the second article 34 into the converging interface 74 of the acute angle 76 toward the originating point 78
96 Second article 34 placing the finger 56 into the open state 66
98 Finger 56 returning to the closed state 70 upon the second article 34 passing through the converging interface 74
100 Engagement of the first article 32 to the second article 34
102 Opening of the converging interface 74
104 Centroid of the second article 34
106 Encompassing the centroid 104 of the second article 34 that is the distance from the centroid 104 to the hook termination 50 when the second article 34 is adjacent to finger surface 58 and hook surface 48
108 Further movement of the second article 34 toward the acute angle 76 originating point 78
110 Forcing the finger 56 into the open state 66 from the second article 34 having further movement 108
112 Sliding contact of the second article 34 against the finger 56 and the hook surface 48 forcing the finger 56 into the open state 66
114 Positioning manually retainer apparatus 30 to be proximate to second article 34
116 Manually placing the finger 56 in the open state 66
118 Moving the second article 34 through the open ended hook 46 to remove the engagement 100 of the first article 32 and the second article 34
120 User's hand

DETAILED DESCRIPTION

Figure 2:
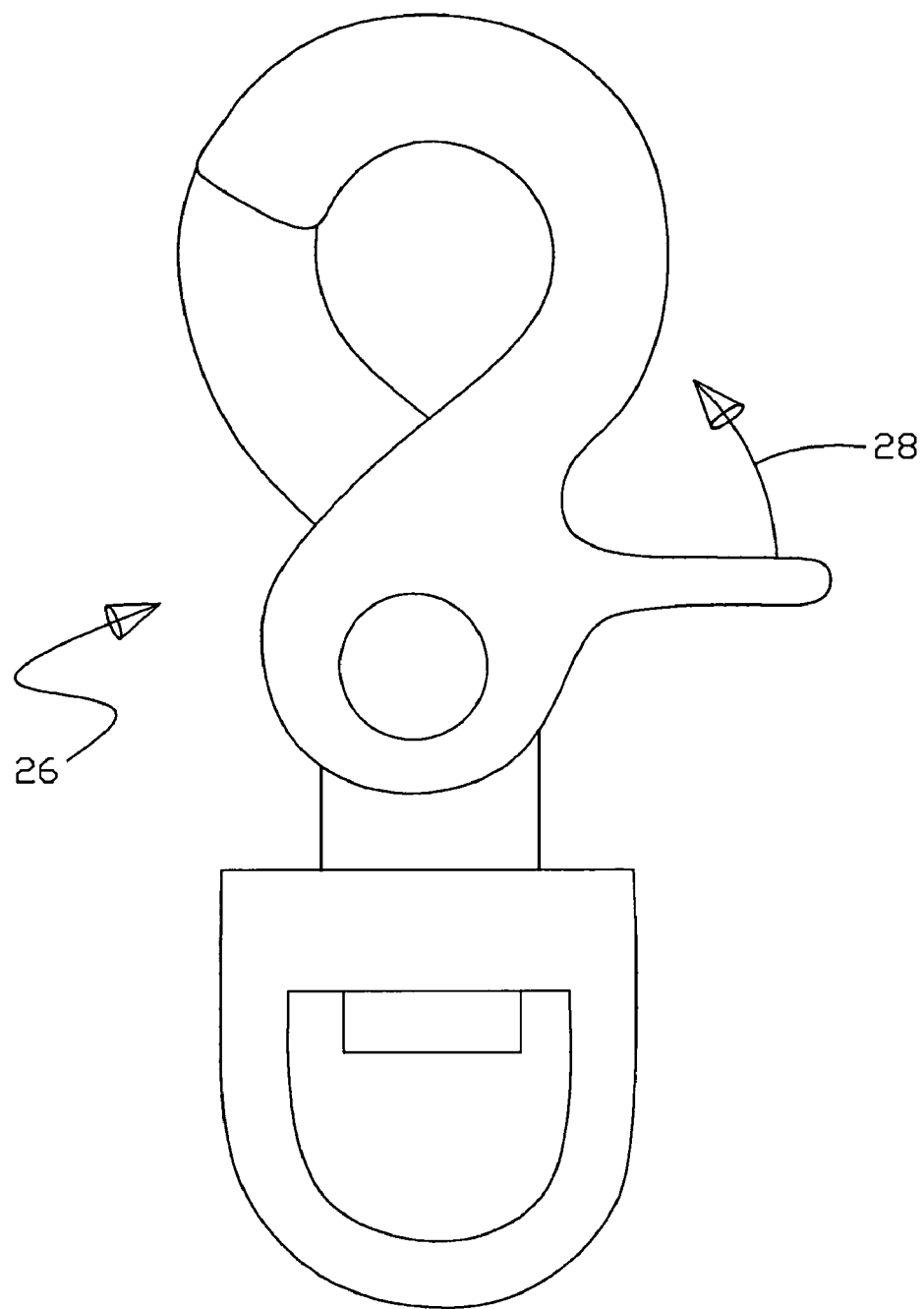
FIG. 2 is a side elevation view of a prior art G3 telemark ski binding leash snap-hook.
Figure 3:
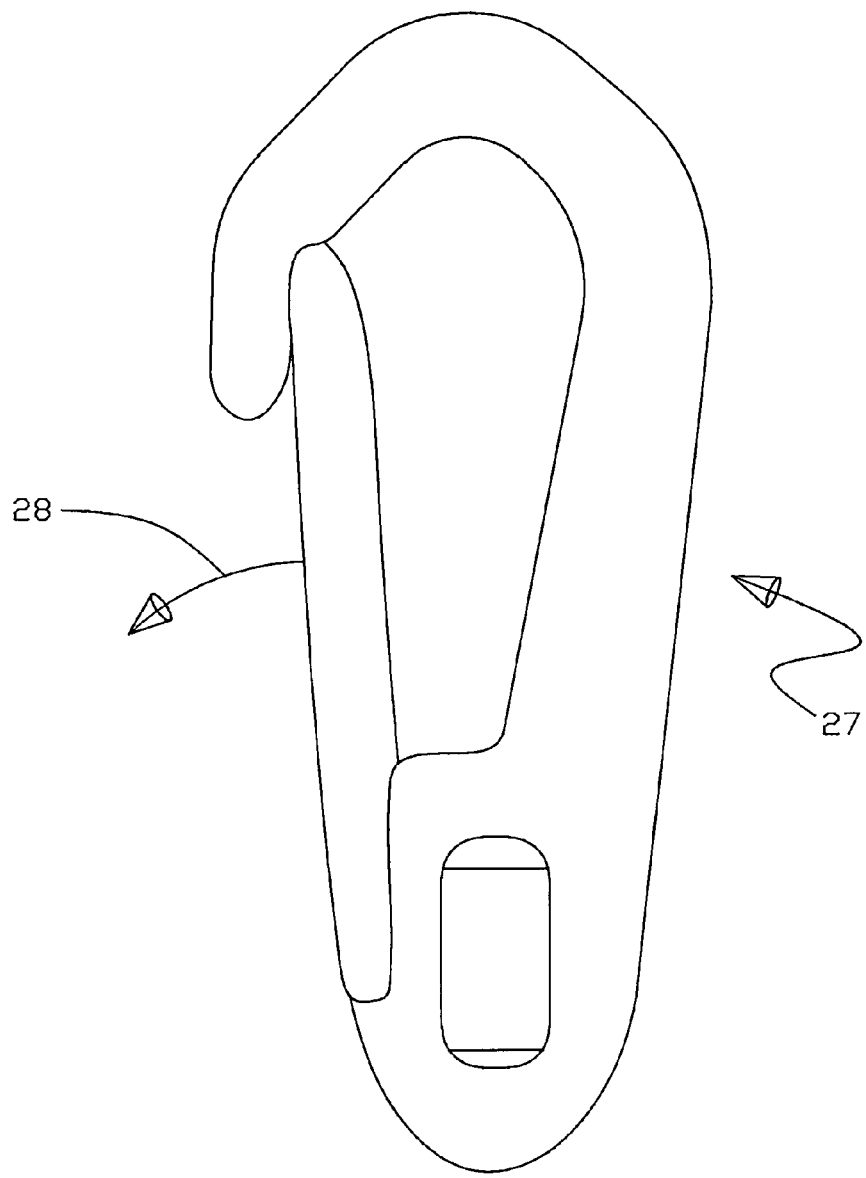
FIG. 3 is a side elevation view of a prior art clip-wire type ski binding leash snap hook.
Figure 4:
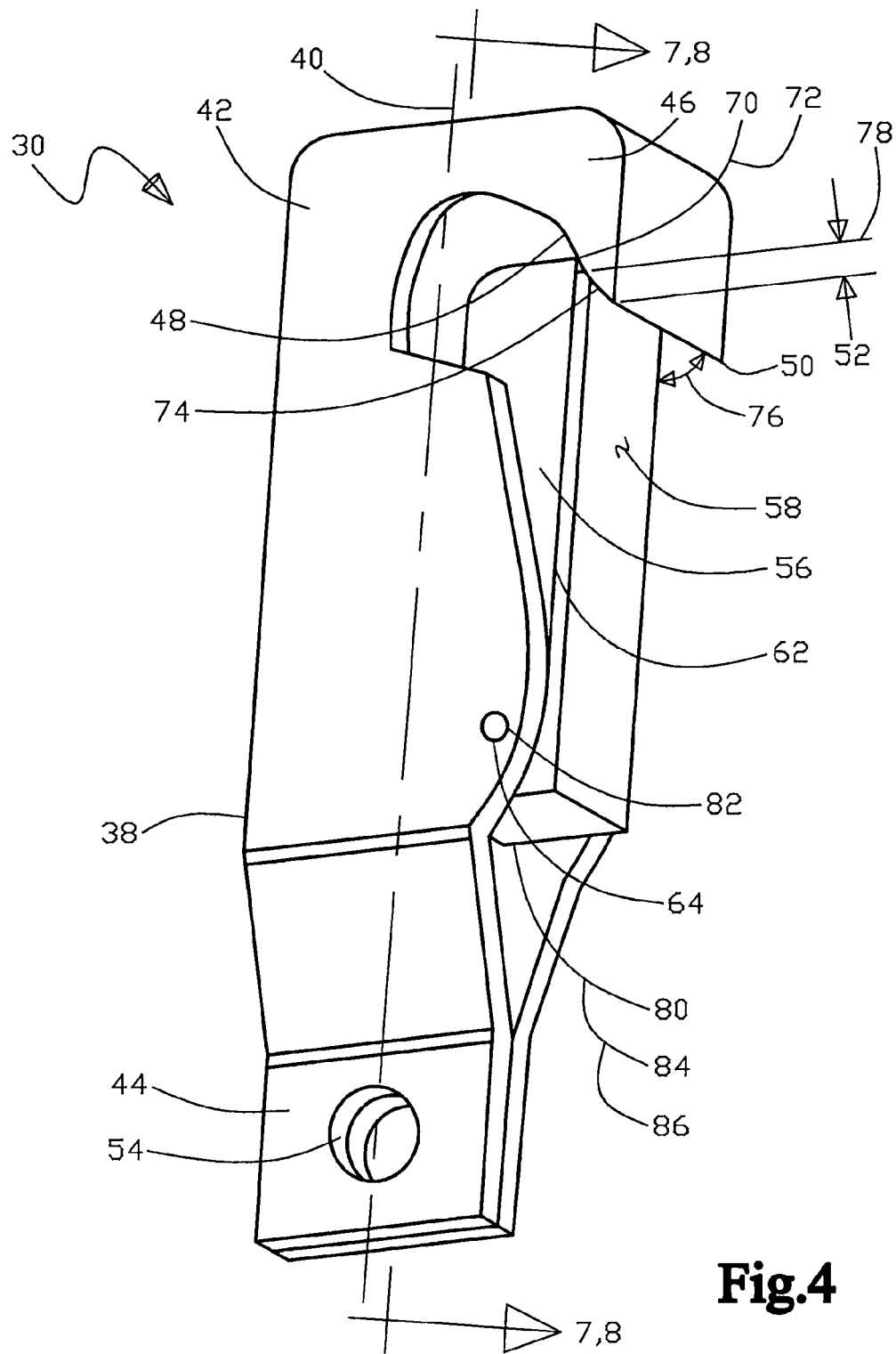
FIG. 4 is a perspective view of the retainer apparatus in a closed state.
Figure 5:
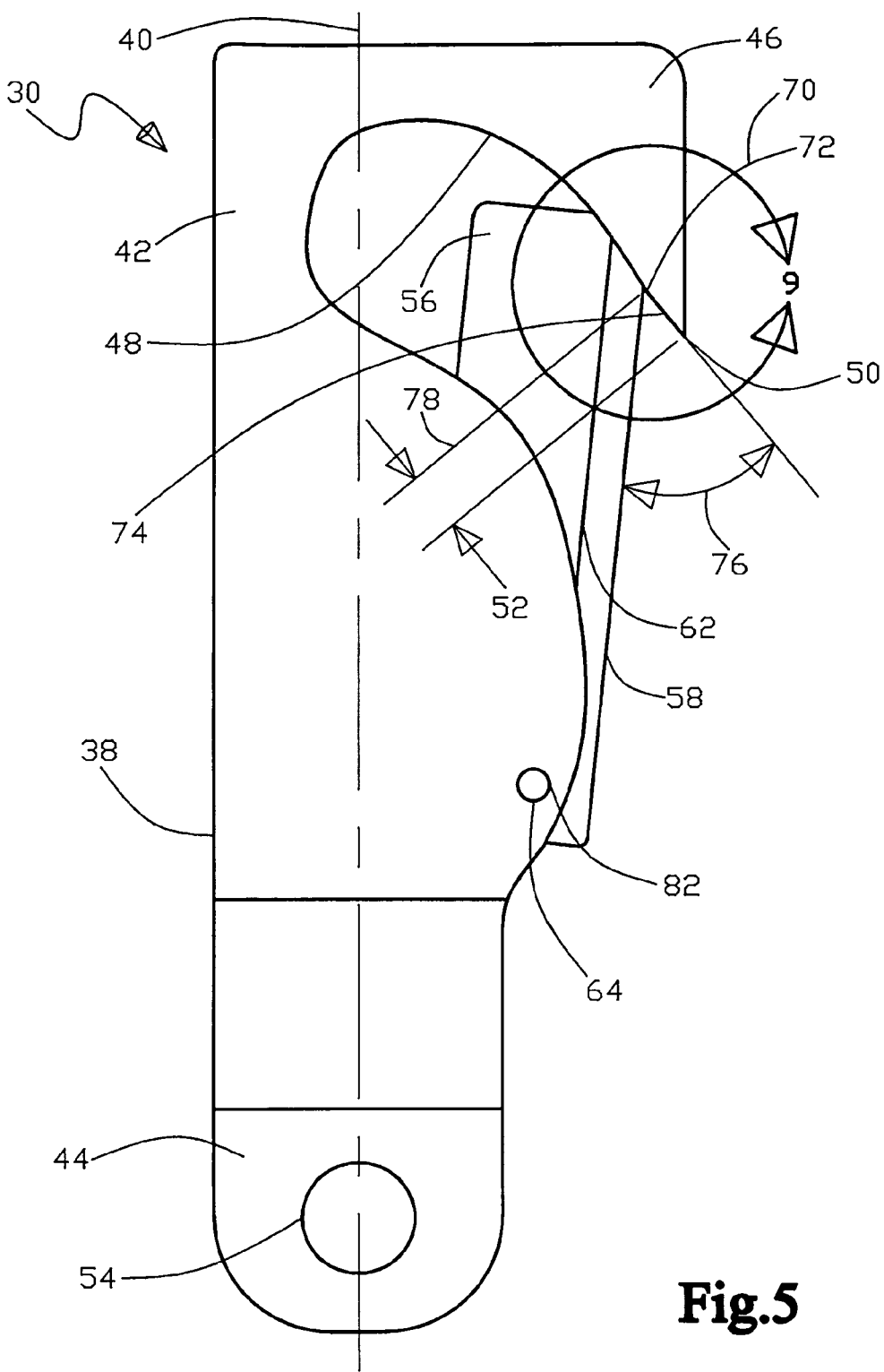
FIG. 5 is a side elevation view of the retainer apparatus in the closed state.
Figure 6:
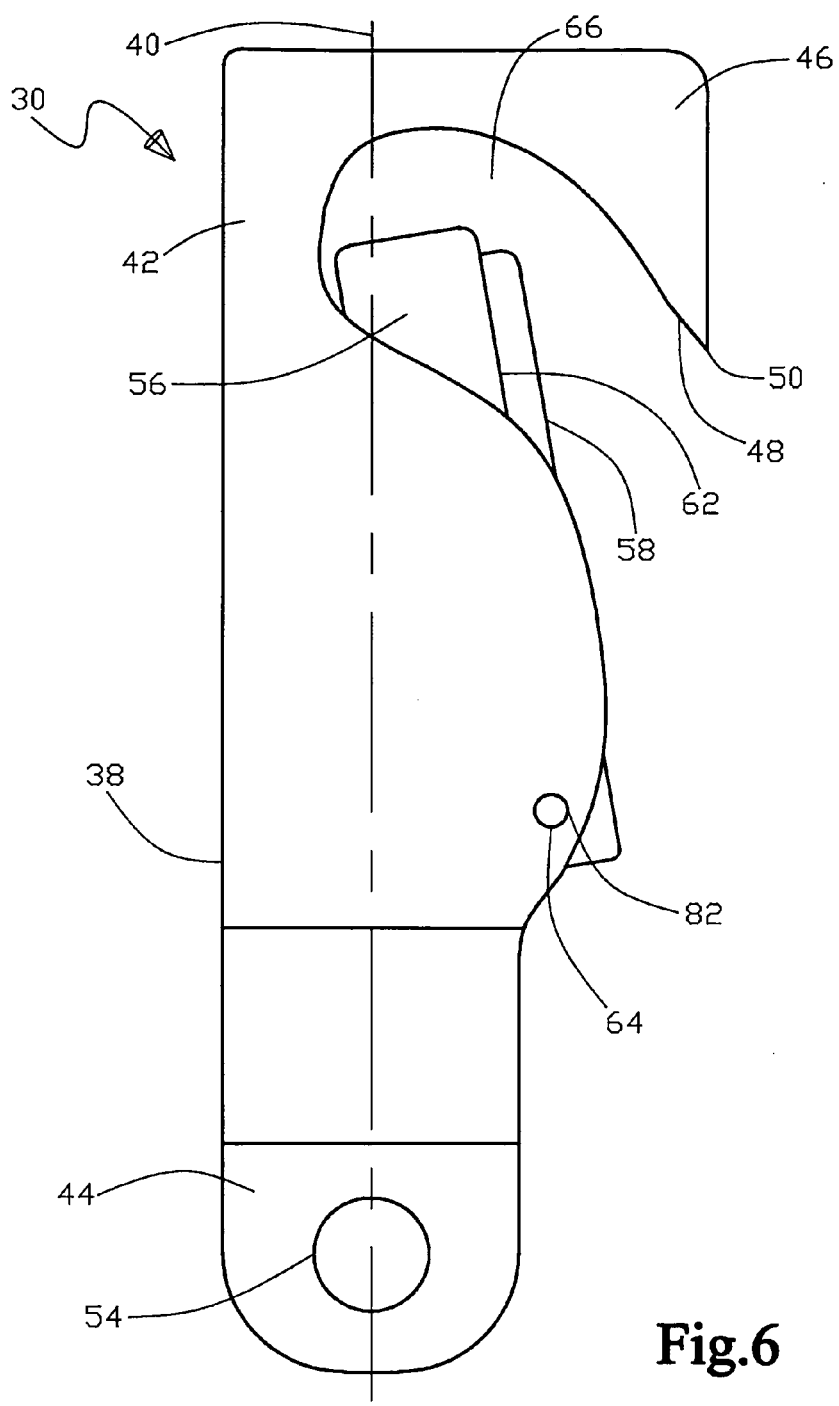
FIG. 6 is a side elevation view of the retainer apparatus in an open state.
Figure 7:
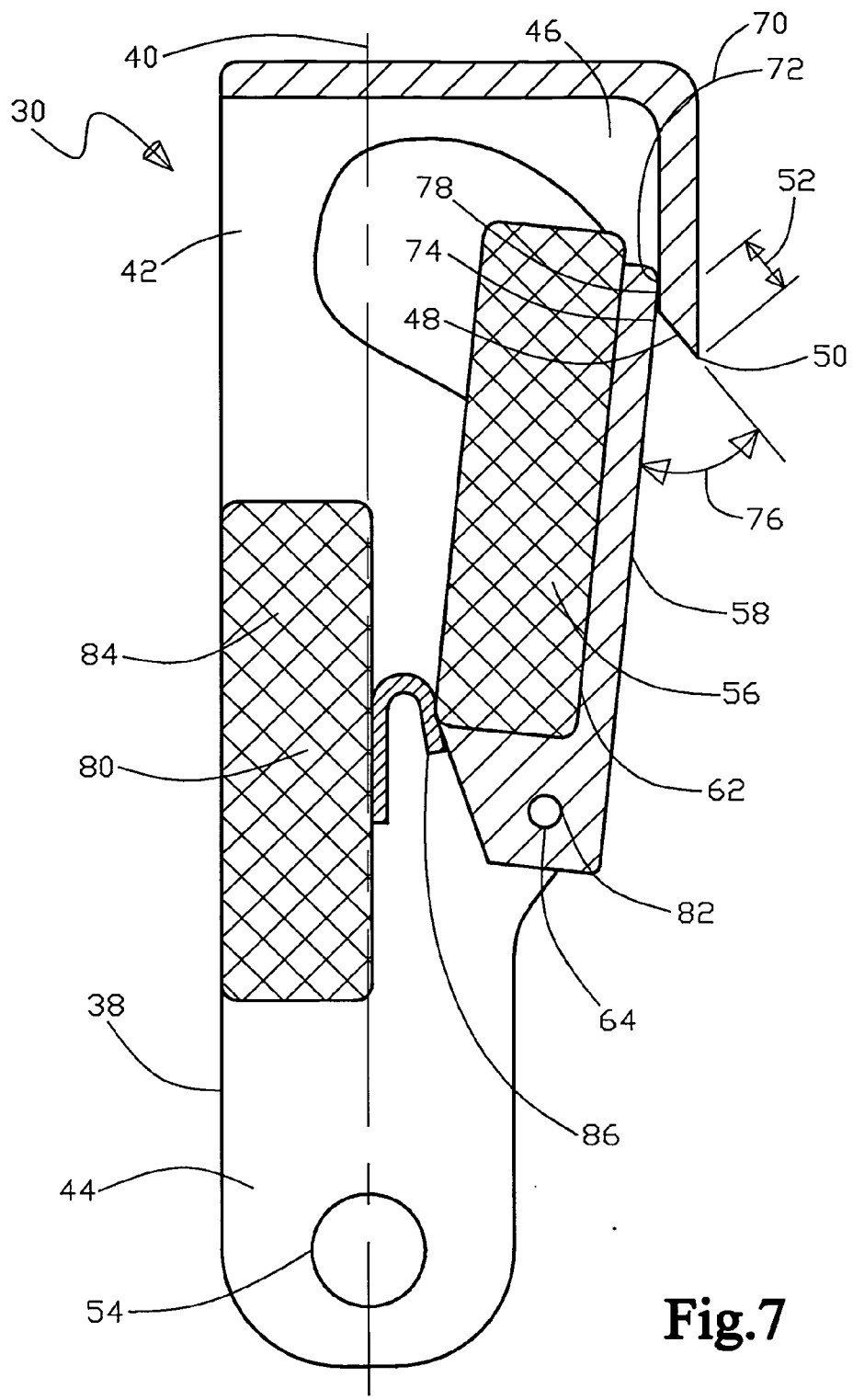
FIG. 7 is a cross sectional view 7-7 from FIG. 4 of the retainer apparatus in the closed state.

With initial reference to FIG. 1 shown is a side elevation view of a prior art snap hook 25 typically used for a pet leash application, with FIG. 2 being a side elevation view of a prior art G3 telemark ski binding leash snap-hook 26, and FIG. 3 is a side elevation view of a prior art clip-wire type ski binding leash snap hook 27. The purpose of the ski leash being to prevent a "runaway" ski, should the skier fall and release their boot from their binding. Continuing, FIG. 4 is a perspective view of the retainer apparatus 30 in a closed state 70, FIG. 5 is a side elevation view of the retainer apparatus 30 in the closed state 70, and FIG. 6 is a side elevation view of the retainer apparatus 30 in an open state 66. Next, FIG. 7 is cross sectional view 7-7 from FIG. 4 of the retainer apparatus 39 in the closed state 70, FIG. 8 is cross sectional view 7-7 from FIG. 4 of the retainer apparatus 30 in the open state 66, and FIG. 9 is expanded view 9-9 from FIG. 5 of the converging interface 74 combined with cross section 9-9 from FIG. 10, to show the second article 34 interaction with the converging interface 74.

Figure 10:
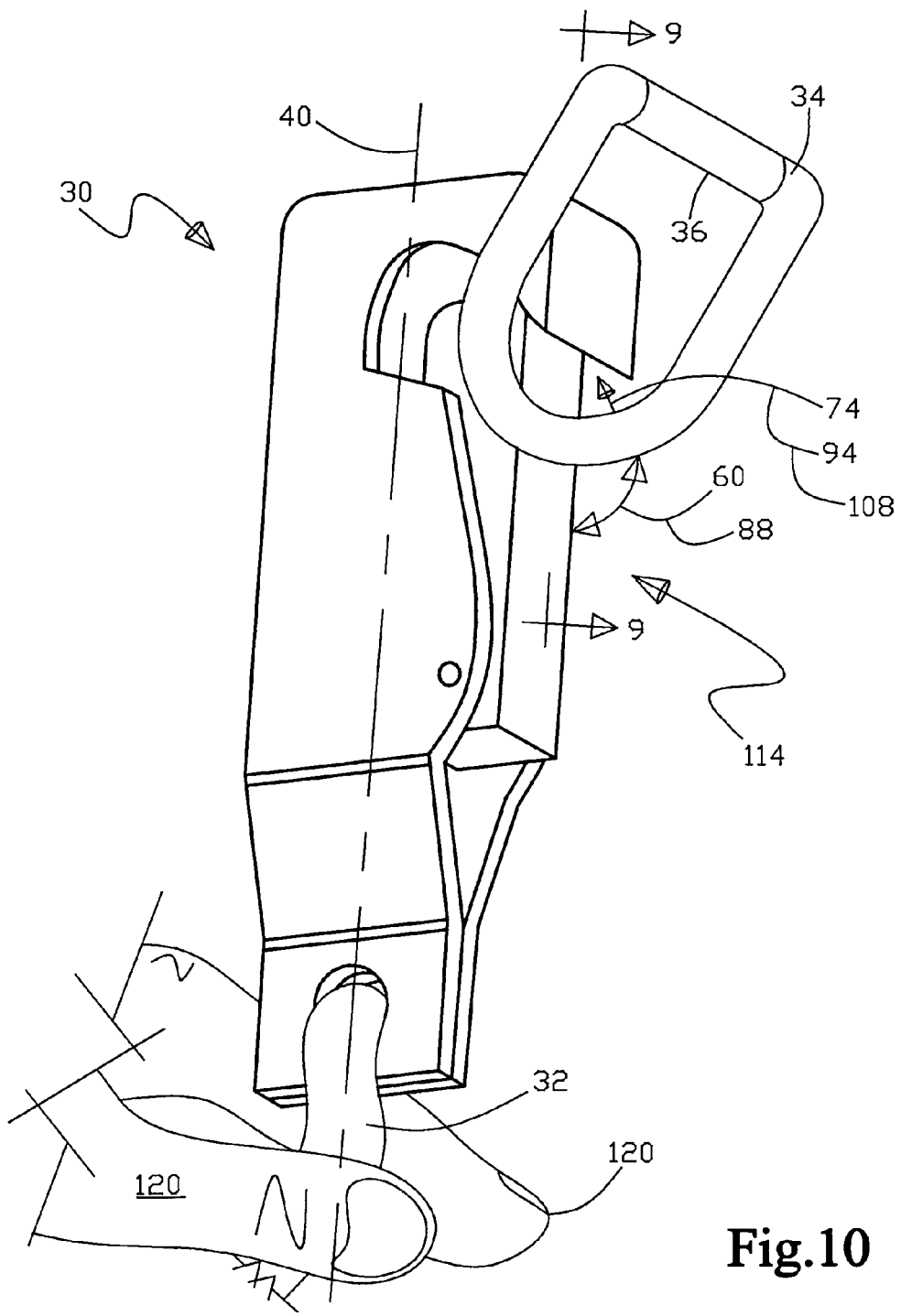
FIG. 10 is a perspective use view of the retainer apparatus with the matingly engagable second article proximate to the retainer apparatus just prior to starting the engagement process, wherein the retainer apparatus is in the closed state.
Figure 11:
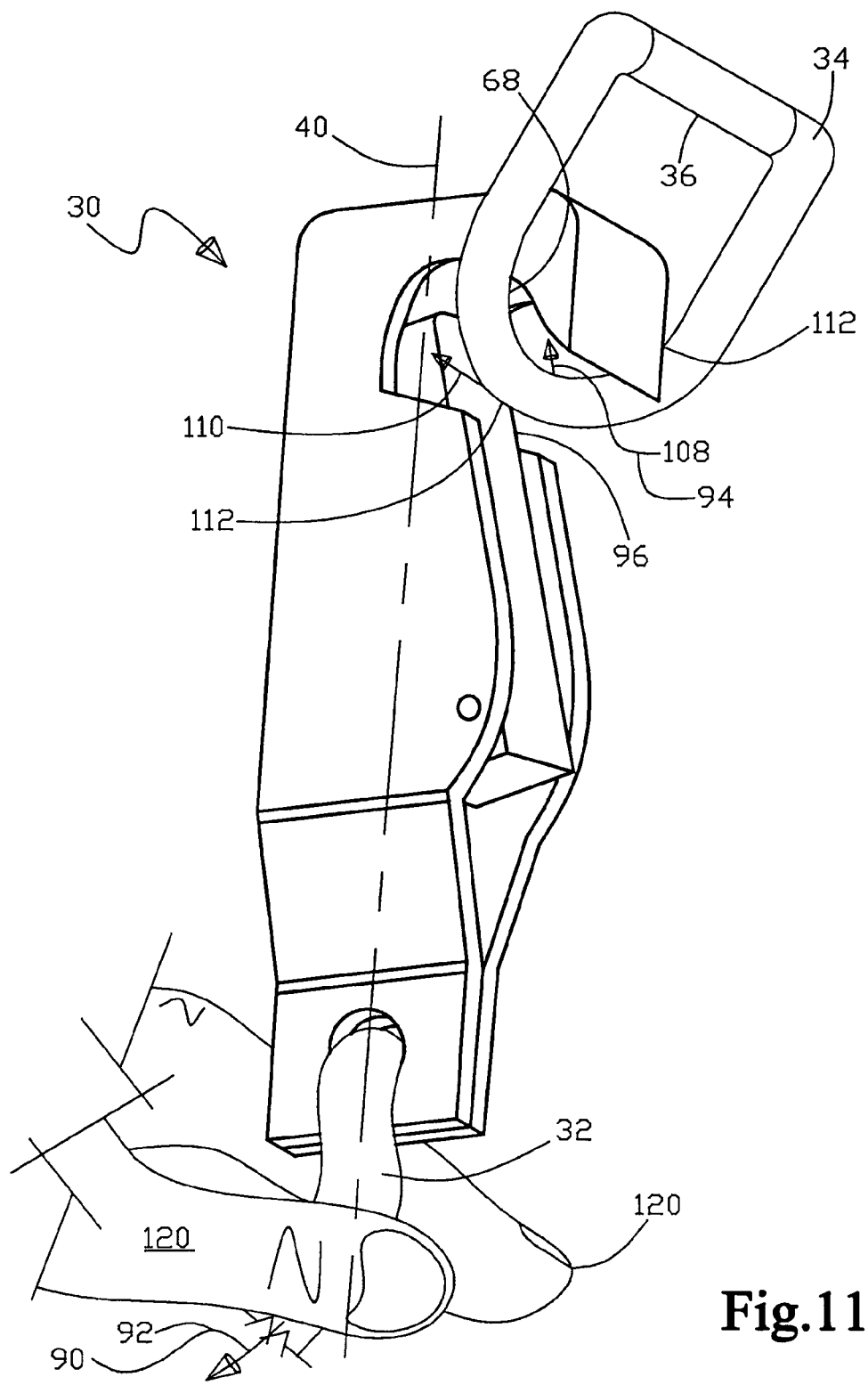
FIG. 11 is a perspective use view of the retainer apparatus with the matingly engagable second article progressing through the engagement process, wherein the retainer apparatus has moved to the open state.
Figure 12:
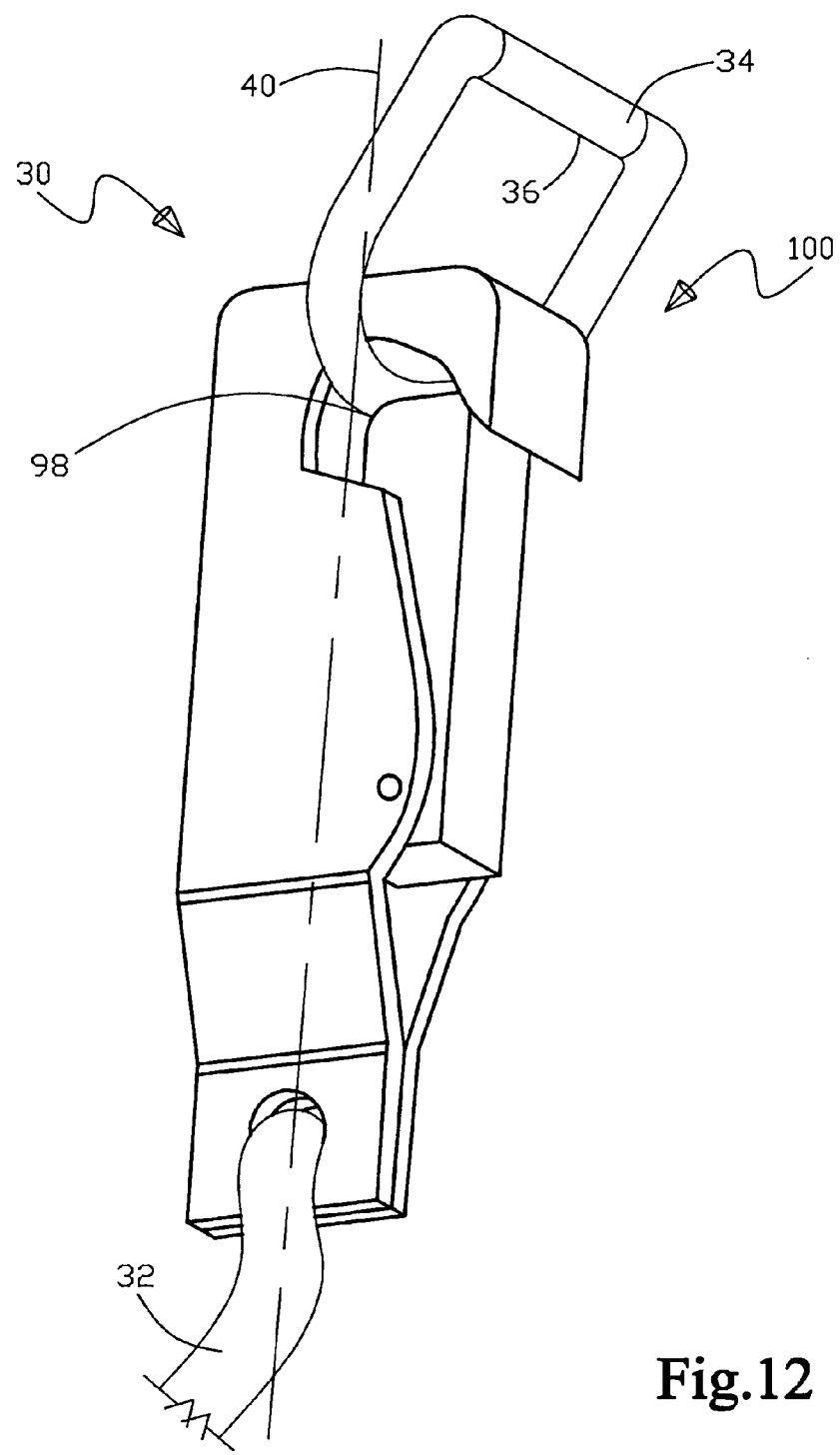
FIG. 12 is a perspective use view of the retainer apparatus with the matingly engagable second article completing the engagement process, wherein the retainer apparatus has returned to the closed state.
Figure 13:
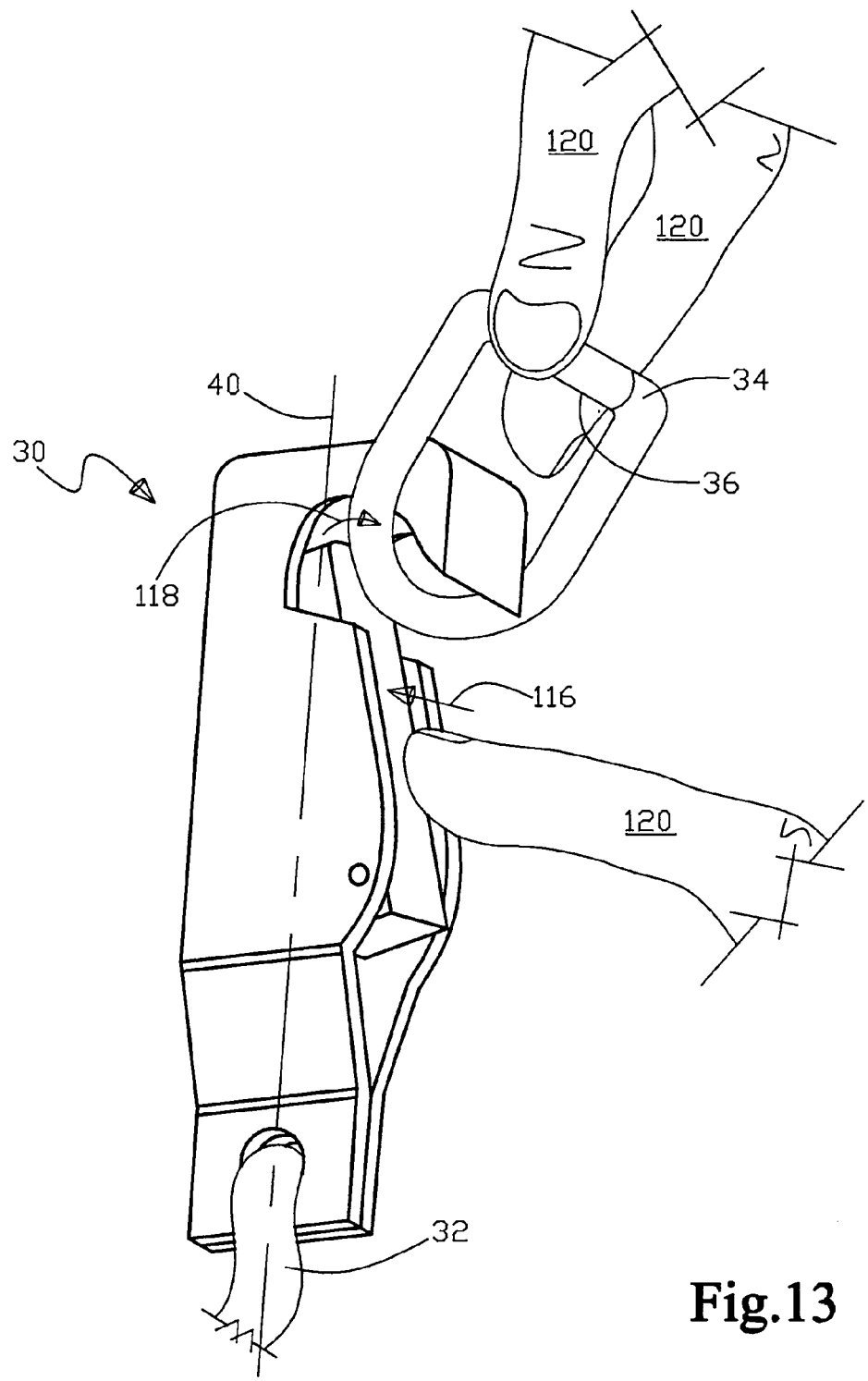
FIG. 13 is a perspective use view of the retainer apparatus with the finger being manually placed into the open position state, thereby allowing disengaging or removing the engagement of the first article from the second article.

Moving onward, FIG. 10 is a perspective use view of the retainer apparatus 30 with the matingly engagable second article 34 proximate 114 to the retainer apparatus 30 just prior to starting the engagement process, wherein the retainer apparatus 30 is in the closed state 70. Further, FIG. 11 is a perspective use view of the retainer apparatus 30 with the matingly engagable second article 34 progressing through the engagement process, wherein the retainer apparatus 30 has moved to the open state 66. Continuing, FIG. 12 is a perspective use view of the retainer apparatus 30 with the matingly engagable second article 34 completing the engagement process, wherein the retainer apparatus 30 has returned to the closed state 70. Also, FIG. 13 is a perspective use view of the retainer apparatus 30 with the finger 56 being manually placed 116 into the open position state 66, thereby allowing disengaging or removing the engagement 100 of the first article 32 from the second article 34.

Figure 8:
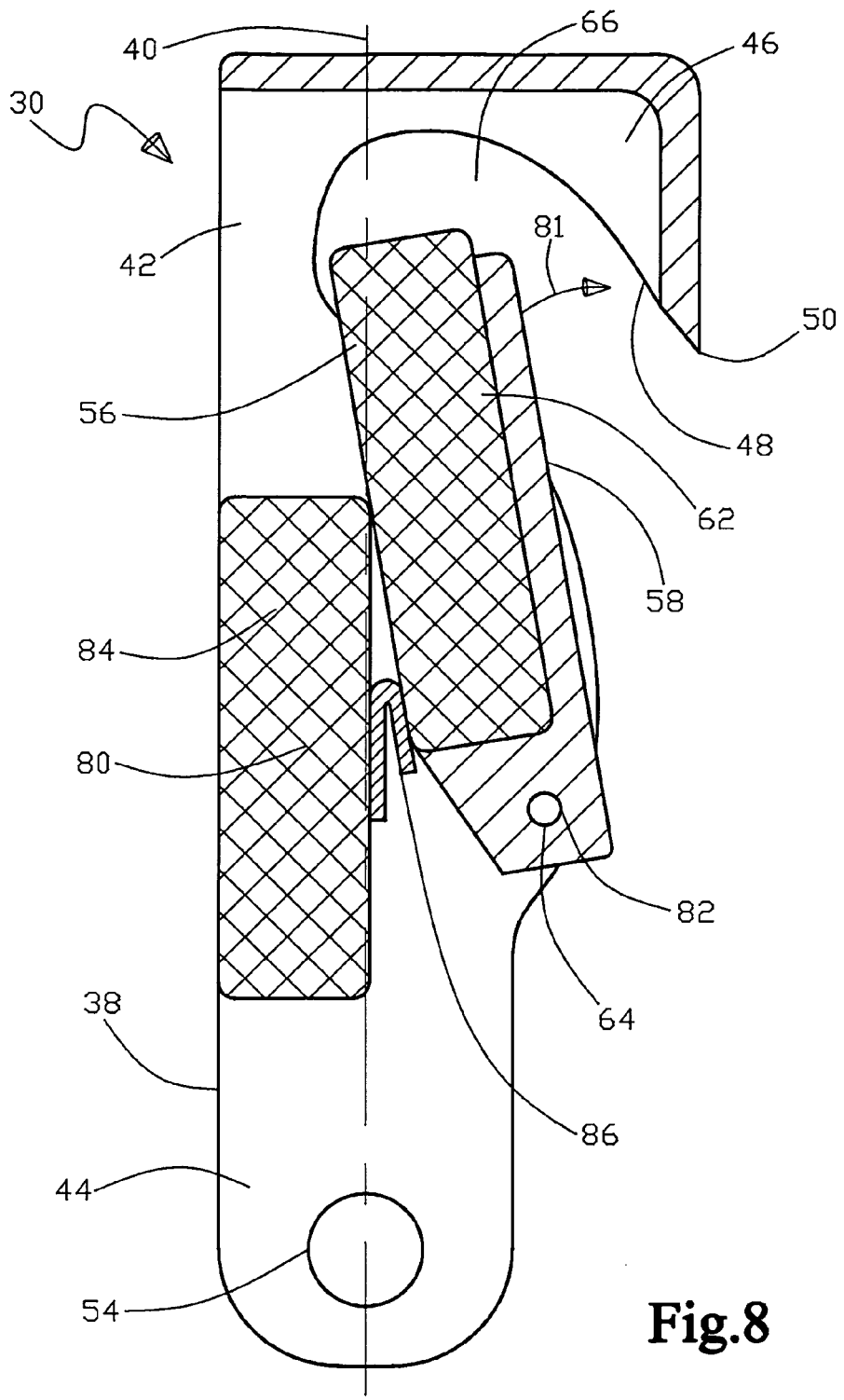
FIG. 8 is a cross sectional view 7-7 from FIG. 4 of the retainer apparatus in the open state.
Figure 9:
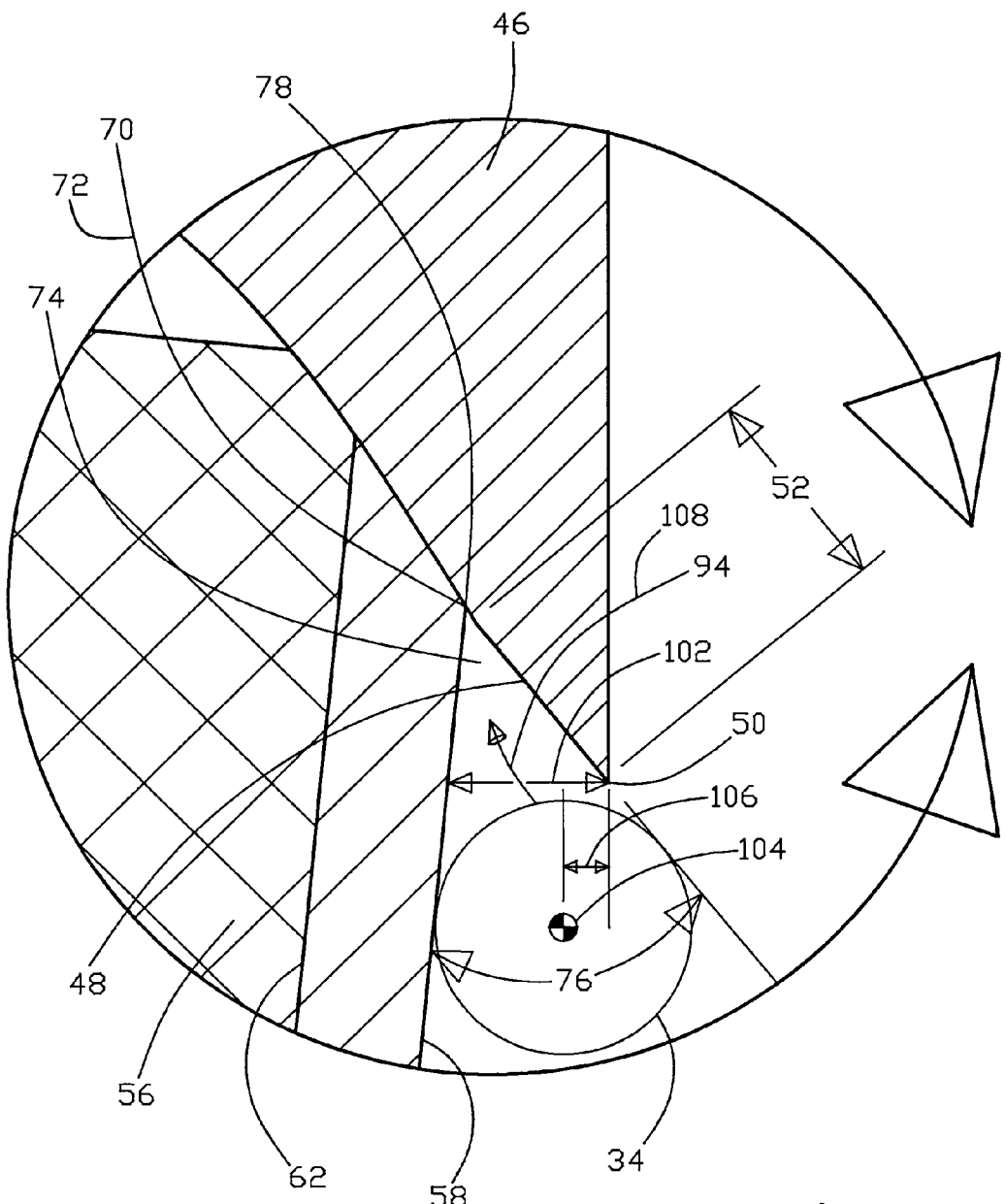
FIG. 9 is an expanded view 9-9 from FIG. 5 of the converging interface combined with cross section 9-9 from FIG. 10, to show the second article interaction with the converging interface.

Broadly, in referring to FIGS. 4 to 9 for structure and FIGS. 10 to 13 for method of use, the present invention is a retainer apparatus 30 for removably 118 engaging 100 a first article 32 to a second article 34. With the second article 34 being capable of magnetic attraction, for example being partially constructed of an iron containing matter, and with the second article 34 having an aperture 36 therethrough, as best shown in FIGS. 10 to 13. The retainer apparatus 30 includes a beam 38 having a longitudinal axis 40, with the beam 38 including a first end portion 42 and a second end portion 44 wherein the longitudinal axis 40 spans in-between the first end portion 42 and the second end portion 44. Further, the first end portion 42 is sized and configured as an open ended hook 46 that is removably engagable 118 and 100 with the second article 34 aperture 36, and with the beam 38 is also adapted to attach 54 to the first article 32. Continuing, the retainer apparatus 30 also includes a finger 56 that is capable of magnetic attraction 60, either by possibly being partially constructed of an iron containing matter or having a magnetic type material adjacent to or disposed within the finger 56 to allow the surface 58 of the finger 56 to have a surface 62 magnetic attraction 60 to the second article 34 resulting in the finger 56 being adjacent to the hook 46 or more particularly to the converging interface 74. Further, the finger 56 is disposed adjacent 64 to the second end portion 44, with the finger 56 having an open state position 66 allowing free passage of the hook 46 through the aperture 36, as best shown in FIGS. 6, 8, and particularly 11 and 13. The finger 56 also having a closed state position 70 wherein the finger 56 is adjacent 72 to the hook 46, see FIGS. 5, 7, 9, 10, 12, and 13, such that the hook 46 and finger 56 form a converging interface 74, see FIG. 9 in particular. In addition, the retainer apparatus includes a means 80 for urging the finger 56 from the open state position 66 to the closed state position 70, in the movement direction 81.

Operationally, looking at FIGS. 10 to 13, the retainer apparatus 30 removably 118 engages 100 the first article 32 to the second article 34 when the finger 56 and the second article 34 are magnetically attracted 60 to one another and then further with a manual application by a user's hand 120 of a single force 90 in a direction 92 to move 94 and 108 the second article 34 into the converging interface 74. With the second article 34 placing 110 the finger 56 into the open state 66 with the finger 56 returning to the closed state 70 upon the second article 34 passing through 94 the converging interface 74 that results in engagement 100 of the first article 32 to the second article 34. This operational sequence can be best followed by looking at FIGS. 10, 11, and 12 in that respective order.

Focusing upon the converging interface 74, and looking at particular to FIG. 9, the converging interface 74 is preferably sized and configured to have an entrance opening 102 that encompasses 106 a centroid 104 of the second article 34. This results in the "drawing in" through movement 108 the second article 34 into the converging interface 74 moving toward the origination point 78 of the acute angle 76 of the converging interface 74 by typically a single handed user 120 manually initiating movement 90 in direction 92, see FIGS. 10, 11, and 12 in that respective order, to allow a single handed single direction motion to engage 100 the first article 32 to the second article 34 by way of the retainer apparatus 30. Again remaining focused upon FIG. 9, it can be seen that the converging interface 74 is formed from the open ended hook 46 terminating 50 in a cantilever fashion to overlap 52 the finger 56 when the finger 56 is in the closed state 70, wherein it can be observed that an acute angle 76 is formed between a surface 48 of the open ended hook 46 and the surface 58 of the finger 56. The dimensions of the converging interface 74 are somewhat open to the extent that functionality can be maintained, being bounded by the relationship shown in FIG. 9 with primarily the encompassing 106 dimension is maintained such that the second article 34 is pulled in 94 and 108 to the converging interface 74 by the second article having sliding contact with the hook surface 48 and the finger surface 58, with the second article 34 moving 94 and 108 to the acute angle 76 origination point 78. Thus the combination of the overlap 52 and the acute angle 76, that results in opening 102 having the ability to encompass 106 the centroid 104 of the second article 34 would determine the desired functionality. Given that determining the two elements for example of an angle and a dimension results in the other dimensions to be known per ordinary skill in the art, such that if the acute angle 76 and overlap 52 are determined then the opening 102 is known, with the opening determining whether the centroid 104 is encompassed 106, resulting in a relationship between the overlap 52, the acute angle 76, and the opening 102 that is based upon the second article 34 centroid 104 dimensional requirements.

To facilitate the magnetic attraction 60 of the finger 56 to the second article 34 the finger 56 can have a magnetic surface 62 that is disposed to face the converging interface 74, as best shown in FIGS. 7 and 8, note that the magnetic surface 62 can either be disposed upon the actual outer surface 58 of the finger 56 or disposed within the finger 56 as long as the finger 56 and the second article 34 are magnetically attracted to one another 60. Further on the means 80 for urging the finger 56 in movement direction 81 going from the open state 66 to the closed state 70, again see FIGS. 7 and 8, the means 80 is preferably magnetic by using magnetic 84 repulsion or attraction to urge the finger 56 to be adjacent to the hook surface 48 thus resulting in the default state of the finger 56 being the closed state position 70. Alternatively, also as shown in FIGS. 7 and 8, a spring element 86 may be used or any other equivalent that accomplishes the finger 56 being urged from the open state 66 to the closed state 70. In conjunction with the aforementioned means 80 the preferred manner of facilitating the adjacent disposing 64 of the finger 56 to the second end portion 44 is by the use of a pivotal attachment 82 of the finger 56 to the beam 38, also as best shown in FIGS. 7 and 8, however, other methods of movable attachment between the finger 56 and the beam 38 would be acceptable such as a ball and socket, magnetic positioning, and the like.

Method of Use

Looking at particular to FIGS. 10 to 13, the use Figures of the retainer apparatus 30 are depicted, with FIGS. 10 to 12 showing the sequence of the retainer apparatus 30 engaging 100 the first article 32 to the second article 34. FIG. 13 shows the disengagement or removing 118 the engagement 100 of the first article 32 from the second article 34 from the retainer apparatus 30. Note that the first article 32 is typically a cable, however being any type of linear extension that the user 120 would desire, such as a rod, rope, a linkage, strap, or any other object that could also be fixed or stationary in position or completely flexible or movable, as long as at least one of the first article 32 or the second article 34 are movable in relation to one another. The second article 34 has the requirements of magnetic attraction and an aperture 36 and is preferably shown as a "D" type ring, however, other types of second articles 34 could be used with the retainer apparatus 30 as long as the above requirements are in place. Thus a method of removably 118 engaging 100 a first article 32 to a second article 34 is disclosed using the retainer apparatus 30, with the second article 34 capable of magnetic attraction and having an aperture 36 therethrough, the method comprising the steps of; firstly providing a retainer apparatus 30 as previously described.

A next step of positioning 114 manually preferably by the user's hand 120, as shown in FIG. 10 the retainer apparatus 30 to be proximate to the second article 34 such that the retainer apparatus 30 preferably via the finger 56 and the second article 34 are magnetically attracted 88 to one another and make contact with one another. Once the prior positioning step is complete substantially as shown in FIG. 10, a subsequent step of moving 90 manually by the user 120 the retainer apparatus 30 to place the second article 34 in the converging 74 interface and continuing manual movement 90 in the direction 92 to move 94 and 108 the second article 34 through the converging interface 74, as best shown in FIG. 11, see also FIG. 9, by the manual movement 90 in direction 92 substantially along longitudinal axis 40. Wherein the second article 34 is operational to place the finger 56 in the open state 66 and subsequently the finger 56 moving into the closed state 70 when the second article 34 moves past the finger 56, thus engaging 100 the first article 32 to the second article 34, as best shown in FIG. 12. In referring back to FIG. 11 momentarily, the second article 34 has sliding movement contact 112 as against the finger surface 58 and the hook surface 48 thus driving or placing 96 the finger 56 from the closed state 70 to the open state 66 from the second article 34, while at close to the same time the hook 46 having free passage 68 through the aperture 36, after which the finger 56 returns 98 by means 80 to the closed state 70, with the result of the first article 32 and the second article 34 being engaged 100 via the retainer apparatus 30, again as best shown on FIG. 12. This operation allows for an easy single movement 90 to engage the first article 32 to the second article 34 using the retainer apparatus 30 by the user's hand 120, with the use of a single hand being possible to use and potentially without having the requirement for a visual contact by the user to "see what they are doing" in engaging the retainer apparatus, the result is that the engagement of the first article 32 and the second article by the retainer apparatus 30 can more easily be done in an area where visual perception or easy access may be difficult for the user.

To disengage or remove 118 the engagement 100 of the retainer apparatus 30, thus separating the first article 32 and the second article 34 with the retainer apparatus, and in referring to FIG. 13, further comprising a step of manually by the user's hand 120 placing 116 the finger 56 in the open state 66 and moving 118 the second article 34 through the open ended hook 46 to remove the engagement of the first article 32 and the second article 34 by the retainer apparatus 30.

CONCLUSION

Accordingly, the present invention of a retainer apparatus has been described with some degree of particularity directed to the embodiments of the present invention. It should be appreciated, though, that the present invention is defined by the following claims construed in light of the prior art so modifications the changes may be made to the exemplary embodiments of the present invention without departing from the inventive concepts contained therein.

The invention claimed is:

1. A retainer apparatus for removably engaging a first article to a second article, the second article being capable of magnetic attraction and having an aperture therethrough, said apparatus comprising:
   (a) a beam having a longitudinal axis, said beam including a first end portion and a second end portion wherein said longitudinal axis spans therebetween said first end portion and said second end portion, said first end portion is affixed as an open ended hook having an inside surface that faces inward toward said beam, said open ended hook terminates as a cantilever, said open ended hook is solely removably engagable with the second article aperture, by contact with said cantilever and said hook inside surface, said beam first end portion is adapted to attach to the first article;
   (b) a finger that is pivotally connected to said second end portion, said finger only having pivotal movement disposed completely within said hook inside surface as between an open state position allowing free passage of said hook through the aperture, and said finger also having a closed state position wherein said finger is in contact with said hook inside surface to said hook such that said hook and finger form a converging interface, said converging interface has an entrance opening that encompasses a centroid of the second article, wherein said finger has a magnetic surface resulting in said converging interface having a single magnetic surface when in said closed state, said magnetic surface is in contact with said hook inside surface; and
   (c) a means for urging said finger from said open state position to said closed state position, wherein operationally said retainer apparatus removably engages the first article to the second article when said finger and the second article are magnetically attracted to one another with a manual application of a single force in a direction to further the second article into said converging interface with the second article placing said finger into said open state with said finger returning to said closed state upon the second article passing through said converging interface and onto said hook resting upon said hook inside surface resulting in engagement of the first article to the second article.

2. A retainer apparatus for removably engaging a first article to a second article according to claim 1 wherein said converging interface is formed from said open ended hook terminating in a cantilever fashion to overlap said finger when said finger is in said closed state, wherein an acute angle is formed between a surface of said open ended hook and a surface of said finger.

3. A retainer apparatus for removably engaging a first article to a second article according to claim 2, wherein said overlap is determined from a combination of said acute angle and said entrance opening.

* * * * *